(12) United States Patent
Kim et al.

(10) Patent No.: US 7,278,754 B2
(45) Date of Patent: *Oct. 9, 2007

(54) BACK LIGHT UNIT

(75) Inventors: Jae Bum Kim, Taegu-Kwangyokshi (KR); Seok Hwan Oh, Kyongsangbuk-do (KR); Kwan Sik Moon, Gyeonggi-Do (KR)

(73) Assignee: LG.Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 103 days.

(21) Appl. No.: 11/168,535

(22) Filed: Jun. 29, 2005

(65) Prior Publication Data

US 2006/0092633 A1    May 4, 2006

(30) Foreign Application Priority Data

Nov. 4, 2004   (KR) .................... 10-2004-0089250

(51) Int. Cl.
*F21S 4/00* (2006.01)

(52) U.S. Cl. .................... 362/225; 362/658; 362/647; 362/396; 439/235

(58) Field of Classification Search ................ 362/225, 362/217, 235, 249, 652, 658, 396, 647; 439/235, 439/384, 834; 313/307, 318.03
See application file for complete search history.

(56) References Cited

U.S. PATENT DOCUMENTS

| | | | |
|---|---|---|---|
| 6,749,315 B2* | 6/2004 | Moon et al. ................. 362/97 |
| 6,922,016 B2* | 7/2005 | Yoo et al. .................... 313/607 |
| 7,090,376 B2* | 8/2006 | Kang et al. ................. 362/225 |
| 2005/0083675 A1* | 4/2005 | Huang et al. ................ 362/31 |
| 2005/0141220 A1* | 6/2005 | Kim et al. ................... 362/240 |
| 2005/0265047 A1* | 12/2005 | Yun et al. .................... 362/611 |
| 2006/0250821 A1* | 11/2006 | Kang et al. ................. 362/657 |

* cited by examiner

*Primary Examiner*—Thomas M. Sember
(74) *Attorney, Agent, or Firm*—Birch, Stewart, Kolasch & Birch, LLP

(57) ABSTRACT

A back light unit includes a plurality of lamps arranged at predetermined distances from each other, each lamp having a lamp tube provided with electrodes at both ends thereof. Common electrodes communicate with both ends of said plurality of lamps and contain a plurality of gripping members for accomodating each of said plurality of lamps. A plurality of releasable connectors fix the common electrodes to first and second lower structures formed below both ends of the plurality of lamps. Electrical connecting elements connect the common electrodes to an inverter.

19 Claims, 9 Drawing Sheets

BACK LIGHT UNIT

This application claims the benefit of the Patent Korean Application No. P2004-89250, filed on Nov. 4, 2004, which is hereby incorporated by reference as if fully set forth herein.

BACKGROUND OF THE INVENTION

1. Field of the Invention

The present invention relates to a back light unit, and more particularly, to a back light unit which has common electrodes capable of applying electrical power to light-emitting lamps without soldering.

2. Discussion of the Related Art

Generally, a CRT (Cathode Ray Tube) is employed for a monitor of a TV, of a measuring instrument and of an information terminal. A CRT is not capable of meeting the demands of miniaturization and lightweight due to its own weight and size.

A CRT is expected to be replaced by a LCD (Liquid Crystal Display), a PDP (Plasma Display Panel) and an ELD (Electro Luminescence Device) due to the limit of weight and size. The LCD uses the field optical effect, a PDP uses a discharging gas and an ELD uses the field luminous effect. Studies involving the LCD are presently ongoing.

To replace the CRT, a LCD apparatus is currently under development and has shown to provide many advantages, such as small size, lightweight and low electrical power consumption. Such a LCD apparatus has been applied as a monitor of a lap top computer, a monitor of a desk top computer and a large information display apparatus.

Since a LCD apparatus displays a picture by adjusting the amount of light from the outside, a back light unit is needed as another source of light to irradiate light to a LCD panel.

Generally, a back light unit is classified into an edge type and a direct type according to the disposition of cylinder-shaped luminous lamps.

In the edge type, a lamp unit is installed in the side of a light guide element. The lamp unit includes a lamp emitting light, a lamp holder interposed between both ends of the lamp to protect the lamp, and a lamp reflection sheet for reflecting light emitted from the lamp to the light guide element.

The edge type in which the lamp unit is installed on the side of the light guide element is applied to a small-sized LCD apparatus like a monitor of a lap top computer and a monitor of a desk top computer and has the advantages in producing a flat LCD apparatus with equalized irradiation of light and endurance.

The direct type back light unit has been developed since the size of the LCD apparatus has started to increase to be larger than 20 inches. The direct type back light unit directly irradiates light to the front of the LCD panel by disposing a plurality of lamps on the downstream side of a diffusion sheet.

Such a direct type back light unit is applied to a large screen LCD apparatus demanding high brightness due to a higher light utilization efficiency when compared with an edge type back light.

However, the LCD apparatus employing the direct type back light may cause malfunction of lamps or introduce a short lamp life in the case that a large monitor and a large television employing the direct type back light is operated for a long period. Compared with the edge type unit, there are more possibilities where a LCD apparatus employing the direct type back light may have a lamp not operate due to a malfunction of the lamp and the existence of a short lamp life.

Also, in the case where a lamp does not operate in the edge type, only the brightness of the screen may deteriorate. Since the plurality of the lamps is installed at the down side of the screen in the direct type, the portion in which the lamp does not operate is noticeably darker than the other portions Thus the lamps must be replaced repeatedly, requiring the LCD apparatus with the direct unit to have a structure of assembly and disassembly without difficulty.

The direct type back light unit according to the conventional systems is described in the following accompanying drawings.

FIG. 1 is a perspective view of a direct type back light unit according to conventional systems. FIG. 2 is a partial view of a direct type back light unit according to the conventional systems. FIG. 3 is a perspective view of a direct type back light unit according to another conventional system. FIG. 4 is a partial view of a direct type back light unit applying electrical power to a lamp according to another conventional system.

As illustrated in FIG. 1, a conventional back light unit comprises a plurality of lamps 1 with electrodes 2 in both ends of the lamps, a lower structure 3 disposed at both ends of the lamps 1 at a predetermined distance and of which the first side forms grooves to accommodate both ends of the plurality of the lamps 1, a reflection sheet 4 mounted on the lower structure 3, a plurality of lamp holders 5 combined in both ends of a pair of the lamps to fix and support the lamps 1 with the lower structure 3, and an upper structure 6 formed along edges of both ends of the lamps 1 to fix the lamp holders 5.

As illustrated in FIG. 2, the lamp 1 is a CCFL (Cold Cathode Fluorescent Lamp) and comprises electrodes 2 provided in both ends inside a lamp tube, an inner lead line 7 for applying electrical power to the electrodes 2, and an out lead line (not shown) connected to the inner line for applying electrical power outside.

The inner lead line 7 and the outer lead line are connected by soldering 9.

The outer lead line is fixed and connected by a contraction tube 11 and a wire 10 connected to an inverter provided in rear of the lower structure 3.

However the conventional back light unit with the above configuration connects by soldering 9 the inner lead line 7 and the outer lead line to apply a driven voltage to the lamps 1. In the process of modulation the soldered portion between the inner lead line and the outer lead line may experience the most stress when a bending force is introduced like, e.g., the interposition of the contraction tube 11, transportation, and the operator's handling.

The above stress may dislodge the soldered portion 9, whereby the inner lead line and the outer lead line becomes disconnected.

The disconnection of the inner lead line and the outer lead line may cause problems such as lighting malfunction, spark generation, and the like.

Consequently, the conventional systems in which the inner lead line 7 and the outer lead line are soldered together has its drawbacks.

As illustrated in FIG. 3 and FIG. 4, another conventional back light unit utilizes a plurality of lamps 31, an outer case 33 fixing and supporting the lamps 31, light scattering means 35a, 35b, 35c disposed between the lamps 31 and a liquid crystal panel (not shown).

The light scattering means 35a, 35b, 35c are employed to prevent appearance of the lamps from becoming visible on a display surface of the liquid crystal panel and to supply a source of light with uniform luminosity distribution. Diffusion sheets and diffusion plates are disposed between the liquid crystal panel and the lamps 31 to enhance the light scattering efficiency.

A reflection sheet 37 is disposed inside of the outer case 33 in order that light generated from the lamps 31 may be irradiated to the LCD panel, resulting in maximizing the light utilization efficiency.

The lamp 31 is CCFL. Electrodes 32 are disposed in both ends of the lamp tube. When electrical power is applied to the electrodes 32, the lamps 31 emit light. Both ends of the lamps 31 are inserted in holes formed on both sides of the outer case 33.

For transmitting electrical power for driving the lamp, leading wires 39, 39a are connected to both electrodes 32 of the lamps 31. Also, the leading wires 39, 39a are connected to a drive circuit through additional connectors, wherein the additional connectors are needed for each lamp.

That is, a leading wire 39 connected to one electrode 32 of each lamp 31 and a leading wire 39a connected to the other electrode 32 of each lamp 31 are connected to one connector and one of the wires 39, 39a bent into a lower part of the outer case 33 is connected to an additional connector.

The wires 39, 39a passing though a hole of an outer case 33 is fixed in an outer case 33 by soldering 40. The outer case 33 may apply an electrical signal to the lamps 31 by soldering 40 as a printed-circuit board.

However, the conventional back light unit has the difficulty of preventing the soldered portion from falling apart, since the wires 39, 39a are fixed in the outer case 33 by soldering 40.

SUMMARY OF THE INVENTION

Accordingly, the present invention is directed to a back light unit that substantially obviates one or more problems due to limitations and disadvantages of the related art.

An object of the present invention is to provide a back light unit for fixing lamps without soldering, thereby cutting expenses and enhancing work efficiency.

Another object of the present invention is to provide a back light unit capable of contributing to the development of environmentally friendly products by not using soldering.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a back light unit utilizes a plurality of lamps arranged in at a predetermined distance, each lamp having a lamp tube and electrodes on both outer ends of the lamp tube; common electrodes formed in a gripping member to fix both ends of the lamps; first and second lower structures formed in one direction below both ends of the plurality of lamps; a plurality of releasable/fixing members, e.g., screws, to fix the common electrodes to the first and second lower structure respectively; and connectors, e.g., wires connecting the common electrodes to an outer inverter. The common electrodes contain a plurality of gripping members spaced apart from each other to fasten the electrodes of each lamp to each common electrode, first and second common electrode lines formed on both sides of the gripping members for connecting the gripping members, a plurality of the stoppers formed in the second common electrode line corresponding to each of the plurality of gripping members to prevent the lamp from being inclined to the left or the right when assembling the lamps, and a plurality of holes formed in the first and second common electrodes for attachment to the first and second lower structures, e.g., by screws.

The gripping members wrap around the lamps.

In the gripping members, more than 2 such members are formed at a predetermined distance from each other and each gripping member has a first elastic member having a different length from a second elastic member, with the first and second elastic members facing each other.

The at least two gripping members include a first gripping member and a second gripping member, the first gripping member including a first elastic member having length shorter than the second elastic member, the second grip including the first elastic member having a length longer than the second elastic member.

The stoppers extend in a vertical direction at the end of the second common electrode line.

The second common electrode line is located adjacent to the first common electrode line.

On the upper side of the lamp, a diffusion sheet and a diffusion plate are further disposed for scattering light emitted from the lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
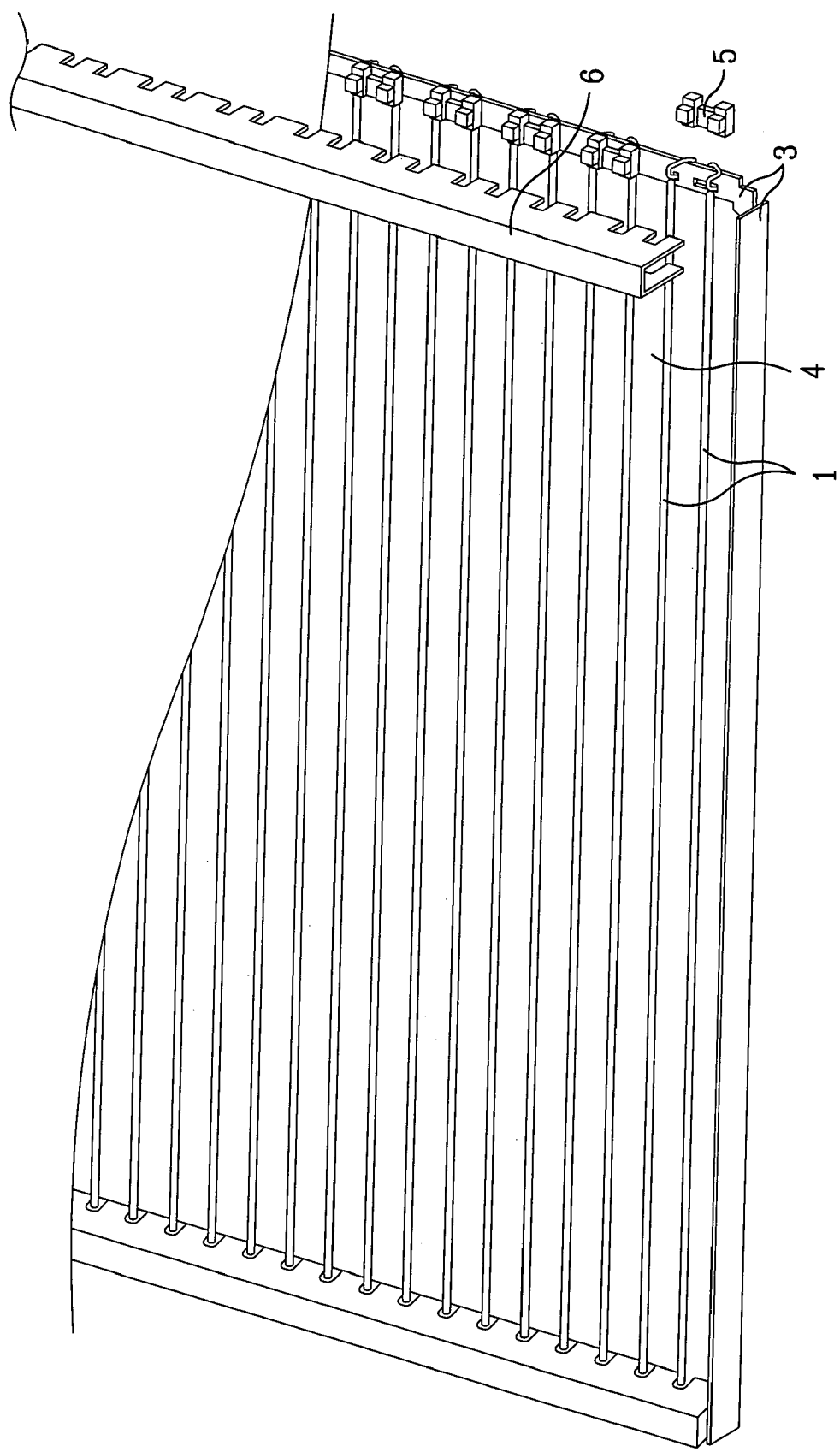
FIG. 1 is a perspective view of a direct type back light unit according to conventional art.
Figure 2:
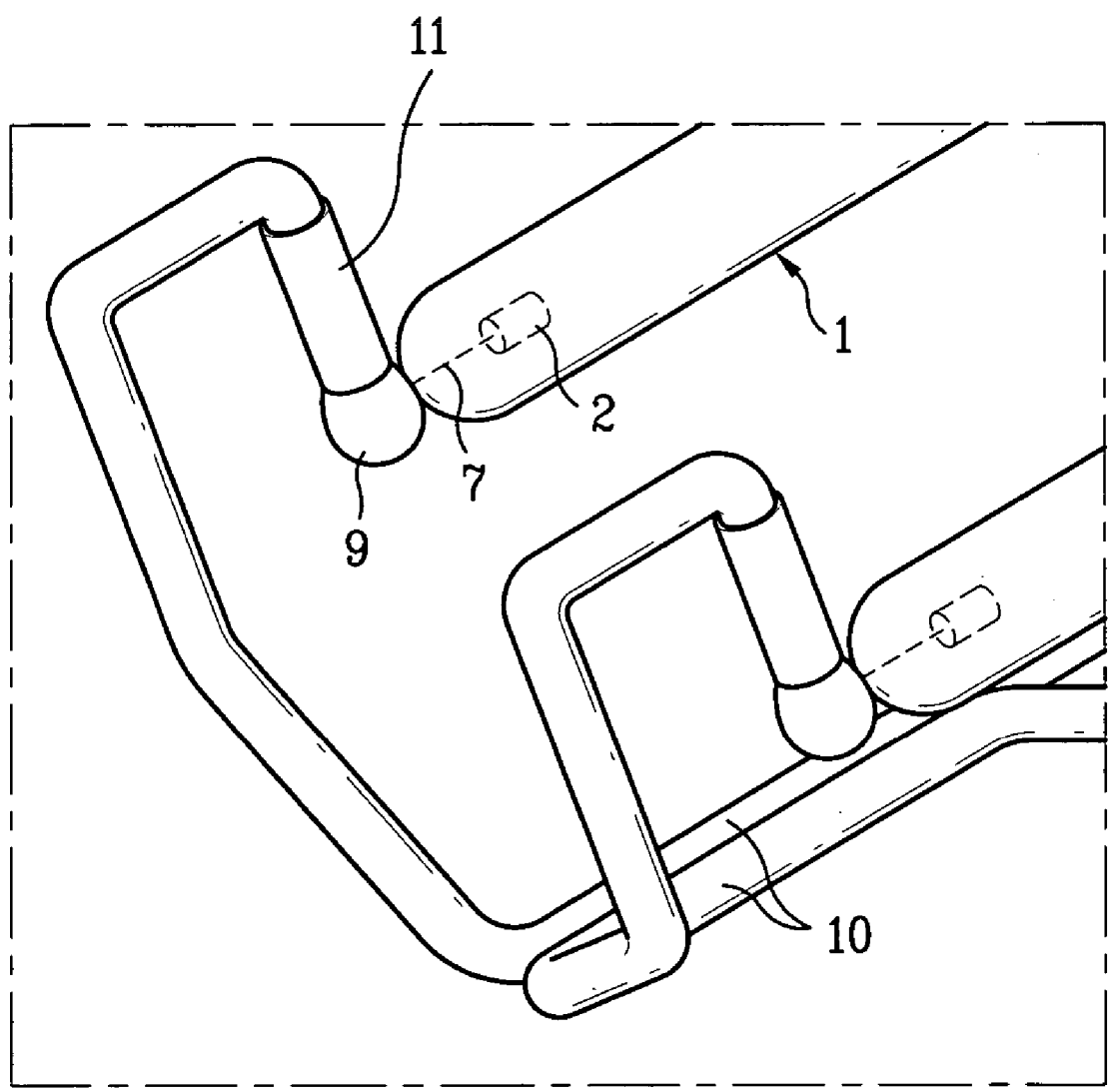
FIG. 2 is a partial view of a configuration of a direct type back light unit according to conventional art.
Figure 3:
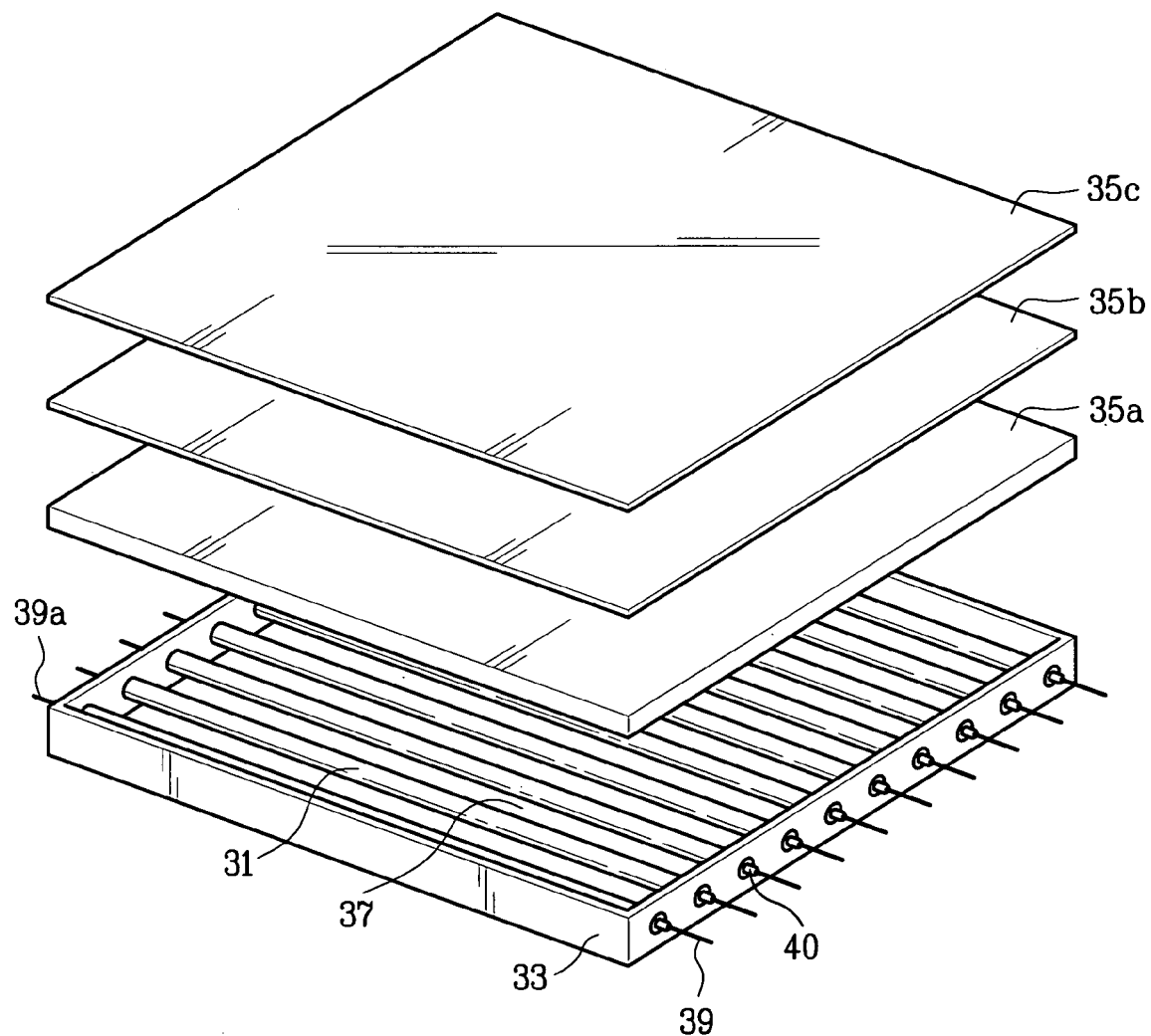
FIG. 3 is a perspective view of a direct type back light unit according to another conventional system.
Figure 4:
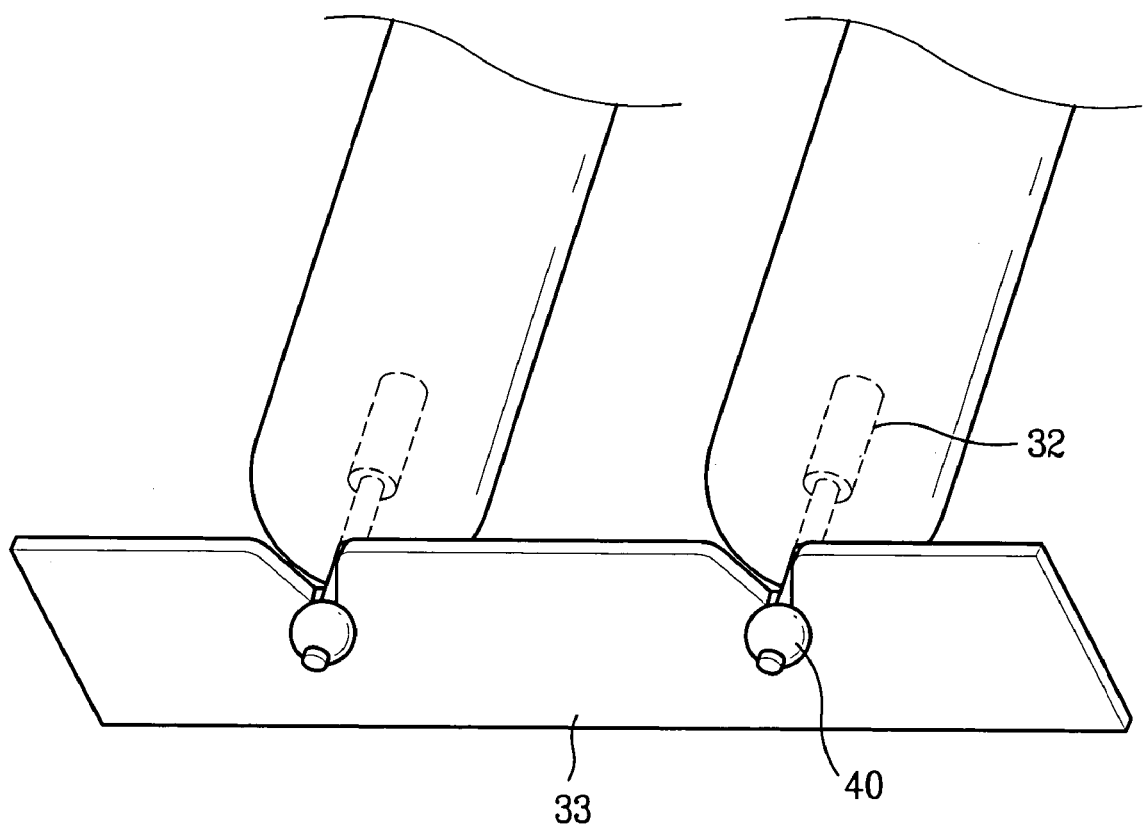
FIG. 4 is a partial view of a configuration of a direct type back light unit applying electrical power to a lamp according to another conventional system.
Figure 5:
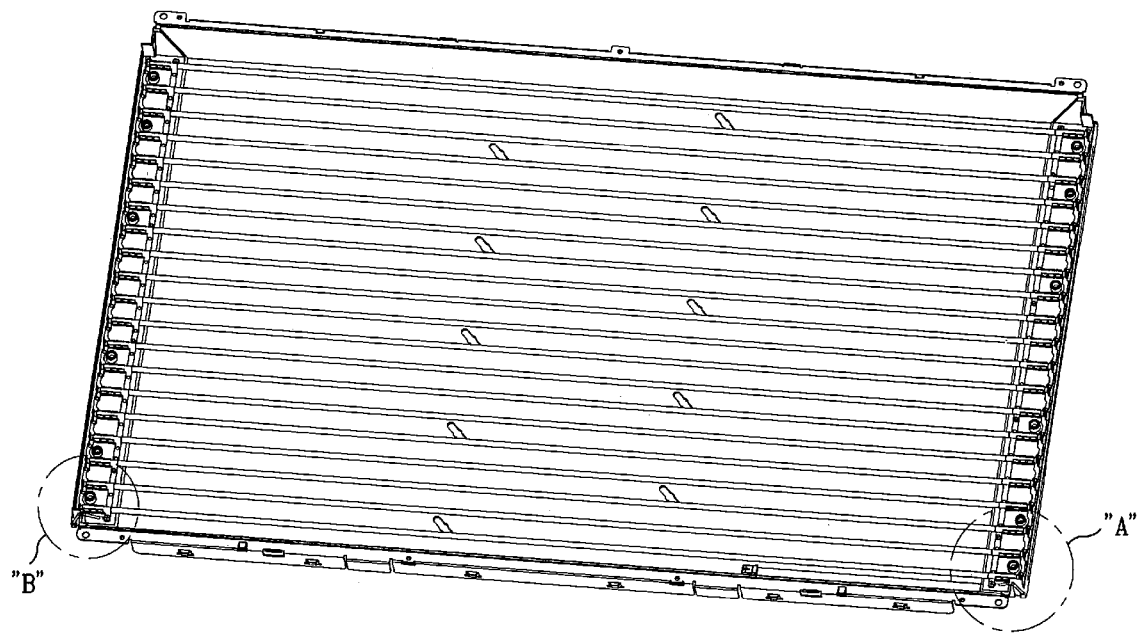
FIG. 5 is a perspective view of a back light unit according to a first embodiment of the present invention.
Figure 6A:
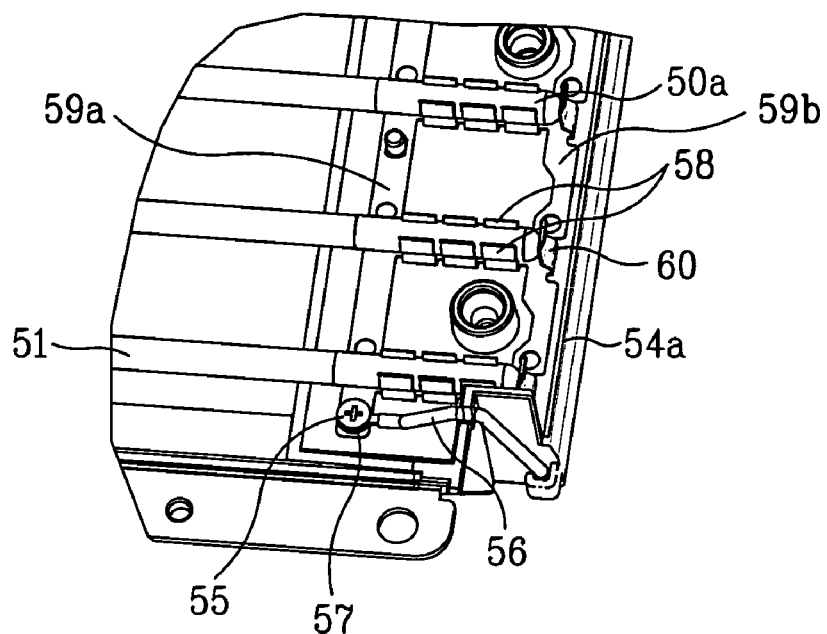
FIGS. 6A and 6B are exploded perspective views of areas A and B of FIG. 5.
Figure 6B:
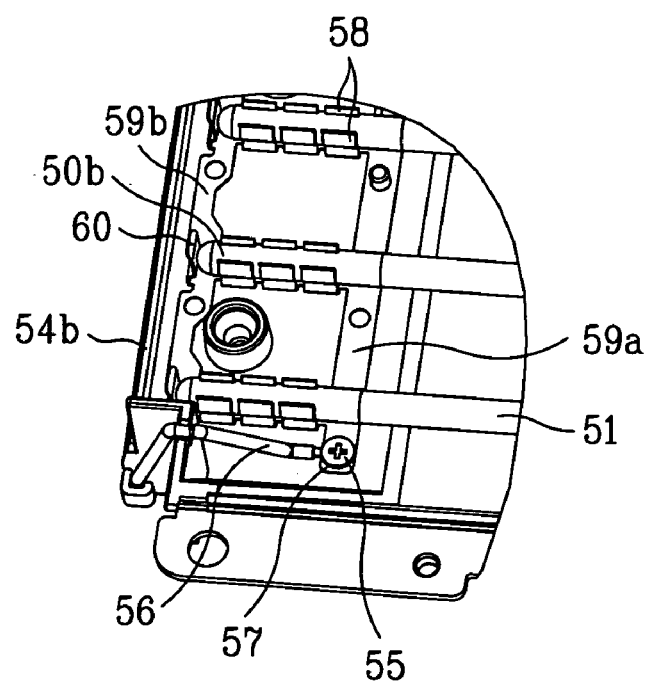
Figure 7:
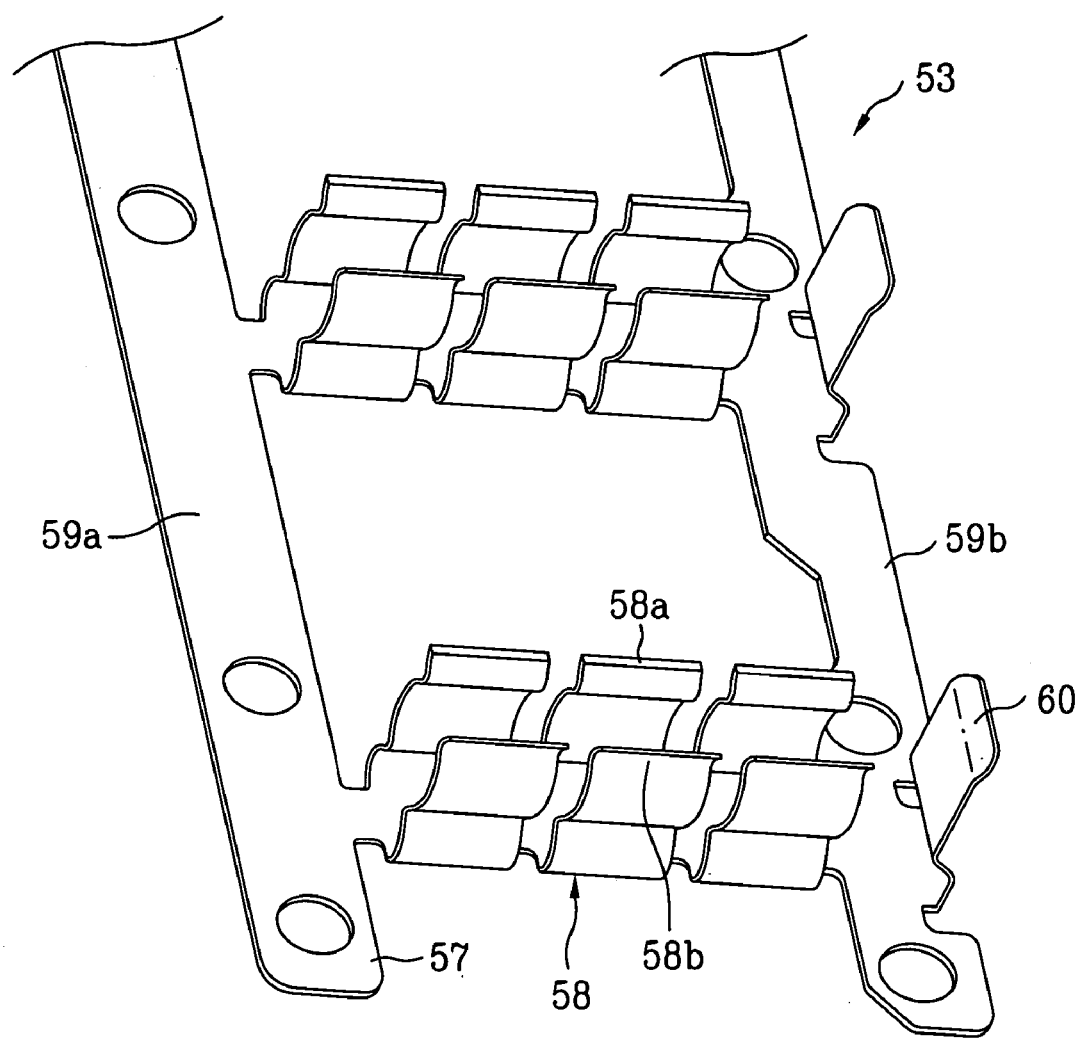
FIG. 7 is a perspective view illustrating a common electrode of the back light unit according to the first embodiment of the present invention.

FIG. 5 is a perspective view of a back light unit according to the first embodiment of the present invention. FIGS. 6A and 6B are exploded perspective views of A and B of FIG. 5. FIG. 7 is a perspective view illustrating a common electrode of a back light unit according to the first embodiment of the present invention.

As shown in FIGS. 5 through 7, a back light unit according to the first embodiment of the present invention utilizes a plurality of lamps 51, two common electrodes 53, first and second lower structures 54a and 54b, a plurality of screws 55, and two wires 56.

The plurality of lamps 51 is arranged at a predetermined distance, each lamp 51 having a lamp tube and two electrodes 50a, 50b on both outer ends of the lamp tube. The common electrodes 53 are formed in a gripper type to fix both ends of each lamp 51. The first and second lower structures 54a and 54b are formed below both ends of the lamps 51 in one direction to seat the common electrodes 53.

A plurality of fixing members, e.g., screws 55, clamps, etc., fix the common electrodes 53 to the first and second lower structures 54a and 54b, respectively. The wires 56 connect the common electrodes 53 with an inverter (not shown).

As shown in FIG. 7, each common electrode 53 comprises a plurality of fastening parts 58, first and second common electrode lines 59a and 59b, a plurality of stoppers 60, a plurality of holes 61, and a circular electrode 57.

The plurality of fastening parts 58 are formed spaced apart with a plurality of gripping members to fasten the electrodes 50a 50b of each lamp 51. The first and second common electrode lines 59a and 59b are formed at both sides of the plurality of fastening parts 58 to connect the fastening parts 58. The at least two gripping members include a first gripping member and a second gripping member, the first gripping member including a first elastic member 58a having a length shorter than the second elastic member 58b, the second gripping member including the first elastic member 58a having a length longer than the second elastic member 58b.

The plurality of the stoppers 60 is formed at the end of the second common electrode line 59b corresponding to each fastening part 58 to prevent the lamps 51 from being inclined to the left or the right when assembling the lamps 51. The plurality of holes 61 is formed in the first and second common electrode lines 59a and 59b. The circular electrode 57 is extended from the first common electrode line 59a to connect the wire 56 with the common electrode 53 using the screw 55.

Each of the gripping members has two semicircular elastic members 58a and 58b facing each other.

The plurality of gripping members wrap around the electrodes 50a and 50b of lamps 51. Since at least two gripping members are formed in the fastening parts 58, the fastening parts 58 reduce loose contact with the lamps 51 caused by process tolerance and maximize contact space, thereby enhancing electrical endurance and electric conductivity.

The fastening parts 58 are formed with gripper type, spring biased elastic members provided in the common electrodes 53. Since the lamps 51 are inserted and fixed in the fastening parts 58, the lamps 51 and the common electrodes 53 are electrically connected without soldering.

Since the common electrodes 53 are connected to wires 56 through the circular electrode 57 by the screws 55, the wires 56 are connected to the common electrodes 53 and the inverter without soldering.

The second common electrode line 59b is disposed spaced apart from the first common electrode line 59a.

As not shown in the drawings, a diffusion sheet and a diffusion plate provided on the upper side of the lamp 51 are further utilized which scatter light emitted from the lamp 51 in order to uniformly distribute the source of light to a display surface of a liquid crystal panel.

A back light unit according to the second embodiment of the present invention has a different common electrode shape, compared with the first embodiment.

For development of a high resolution and high brightness model, EEFLs are added to a back light unit of the same size, so that the lamp interval should be narrower. In the above case, the entire gripping length should be reduced when the semicircular elastic member structure is applied.

However, when the entire semicircular elastic member length is reduced, a problem may arise since the gripping members and the lamps are not in effective contact, thereby causing a deterioration in the reliability of the goods.

Consequently, the back light unit of the second embodiment of the present invention alternately disposes semicircular elastic members having different lengths at predetermined intervals, whereby the gripping members and the lamps are in effective contact, thereby enhancing the reliability of the goods.

Figure 8:
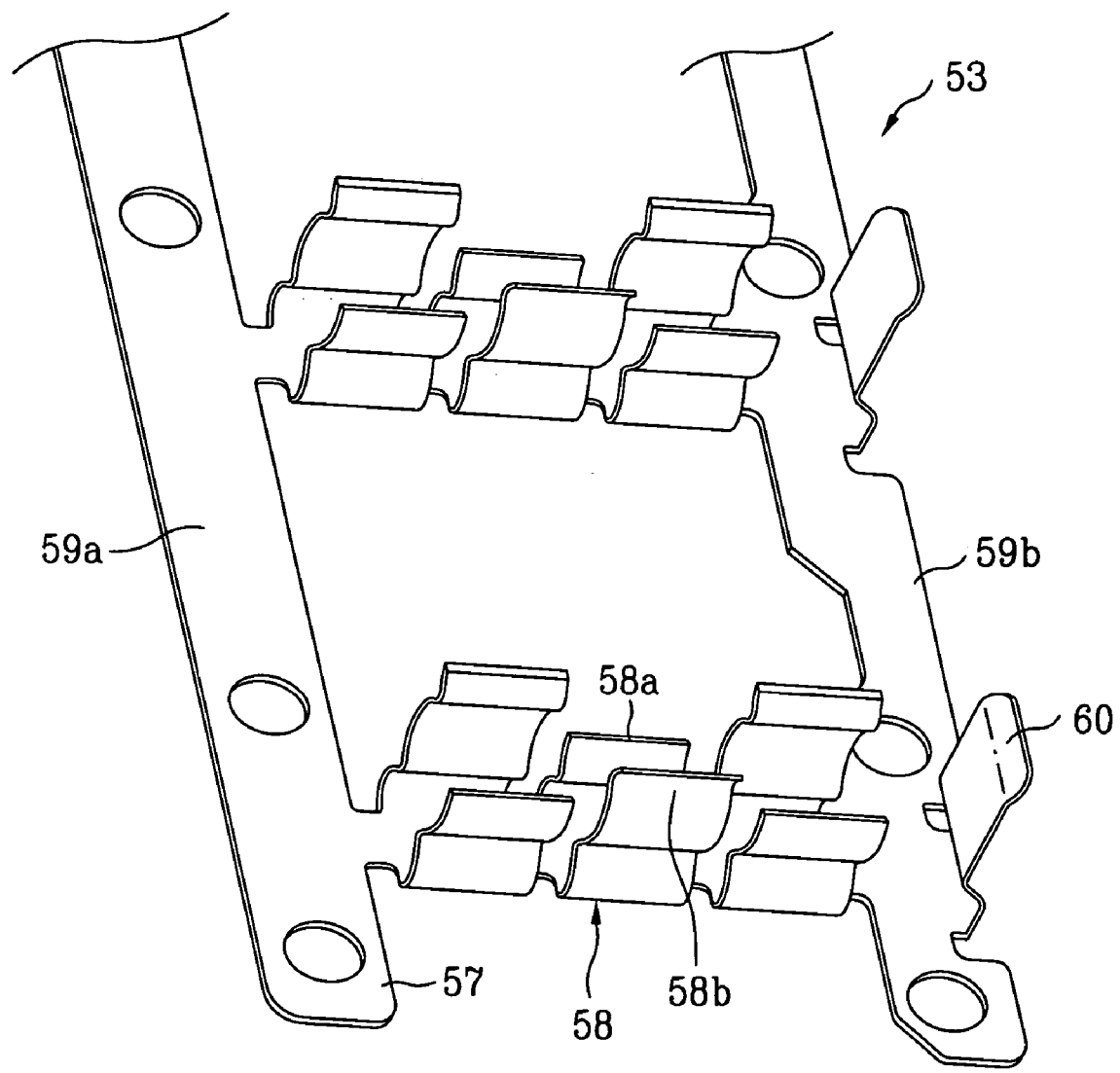
FIG. 8 is a partial perspective view illustrating a common electrode of the back light unit according to a second embodiment of the present invention.
Figure 9:
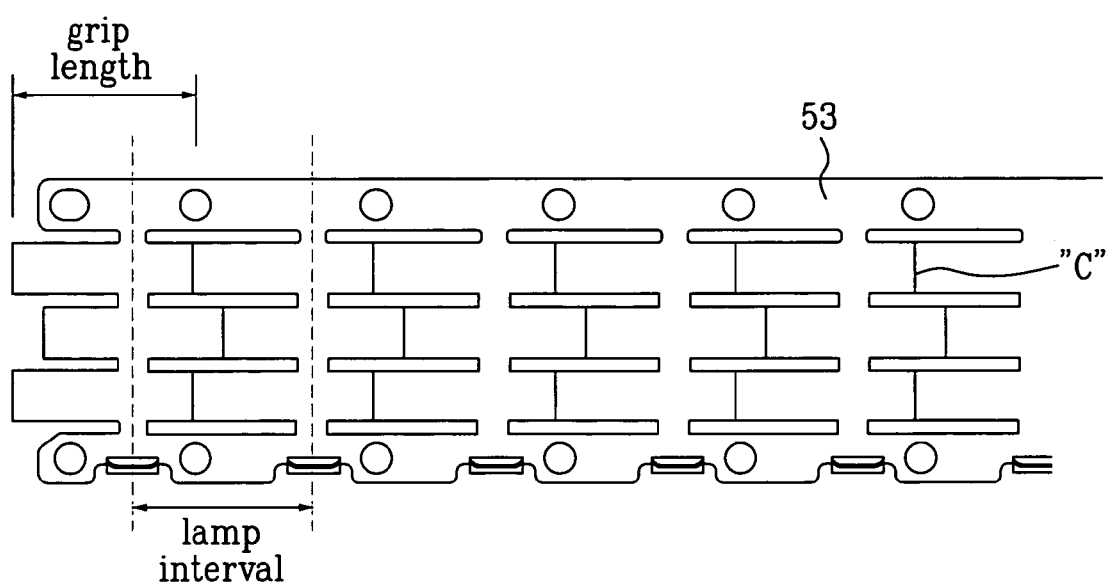
FIG. 9 is a plane view illustrating a common electrode of a back light unit according to the second embodiment of the present invention.

As shown in FIG. 8, each common electrode 53 contains a plurality of fastening parts 58, each of the fastening parts 58 having a plurality of gripping members.

Each of the plurality of gripping members has a first semicircular elastic member 58a and a second semicircular elastic member 58b, the first semicircular elastic member 58a having different length from the second semicircular elastic member 58b. In the plurality of gripping members, a first gripping member has the first semicircular elastic member 58a having a length shorter than the second semicircular elastic member 58b, and a second gripping member has the first semicircular elastic member 58a having a length longer than the second semicircular elastic member 58b.

The first and second gripping members are alternately disposed at a predetermined distance.

The stoppers 60 are vertically positioned at the end of the second common electrode line 59b corresponding to each of the fastening parts 58 to prevent the lamps 51 from being inclined to the right or the left.

As shown in FIG. 8, in the fastening parts 58 according to the second embodiment of the present invention, more than 2 grips are alternately disposed at a predetermined interval and at least two gripping members include a first gripping member and a second gripping member, the first gripping member including the first elastic member 58a having a length shorter than the second elastic member 58b, and the second gripping member including the first elastic member 58a having a length longer than the second elastic member 58b.

Thus gripping members with different lengths may effectively wrap the electrodes of the lamp 51, thereby maintaining good contact between the lamp 51 and the common electrode 53.

Additional lamps may be provided for a model with high resolution and high brightness while maintaining effective contact between the electrodes of the lamps and the common electrodes by alternately disposing the gripping members having a first gripping member and a second gripping member, the first gripping member including the first elastic member having a length shorter than the second elastic member, and the second gripping member including the first elastic member having a length longer than the second elastic member in the common electrode 53.

As can be readily appreciated, the opposing elastic members of each gripping member can have the same length or different lengths, and each of the gripping members can have the same or different lengths from other gripping members. Also, although having at least two gripping members for supporting the electrodes at each end thereof is particularly effective, a single gripping member provided at each electrode end of a lamp tube can be used.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A back light unit, comprising:
    a plurality of lamps arranged at predetermined distances from each other, each lamp having a lamp tube provided with electrodes at both ends thereof;
    common electrodes provided to communicate with both ends of said plurality of lamps, said common electrodes containing a plurality of gripping members for accommodating each of said plurality of lamps, each gripping member defining opposing first and second elastic members, said first elastic member having a different length from said second elastic member;
    first and second lower structures formed in one direction below both ends of the plurality of lamps to seat the common electrodes;
    a plurality of releasable connectors for fixing the common electrodes to the first and second lower structures, respectively; and
    electrical connecting elements for connecting the common electrodes to an inverter.

2. The back light unit of claim 1, wherein the plurality of gripping members of each common electrode are spaced apart from each other to secure the electrode of each lamp to each common electrode,
    said common electrode containing first and second common electrode lines formed at both sides of the gripping members for connecting the gripping members together,
    a plurality of stoppers provided in the second common electrode line corresponding to the gripping members to prevent the lamps from inclining to the right or the left, and
    means provided in the first and second common electrode lines to fix the common electrodes to the first and second lower structures.

3. The back light unit of claim 2, wherein the gripping members wrap around the lamp.

4. The back light unit of claim 2, wherein the at least two gripping members include a first gripping member and a second gripping member, the first gripping member including the first elastic member having a length shorter than the second elastic member, the second gripping member including the first elastic member having a length longer than the second elastic member.

5. The back light unit of claim 2, wherein the stoppers extend vertically from the second common electrode line.

6. The back light unit of claim 2, wherein the second common electrode line is spaced apart from the first common electrode line.

7. The back light unit of claim 2, wherein each of the gripping members having different lengths from other gripping members.

8. The back light unit of claim 1, further comprising a circular electrode which extends from the first common electrode line to provide electrical connection with the common electrode.

9. The back light unit of claim 8, wherein the circular electrode is connected to the inverter by a wire.

10. The back light unit of claim 9, wherein the wire is connected to the circular electrode by a screw.

11. The back light unit of claim 1, further comprising a diffusion sheet and a diffusion plate disposed above the lamp for scattering light emitted from the lamp.

12. The back light unit of claim 1, wherein the electrical connecting elements are wires.

13. The back light unit of claim 1, wherein the releasable connectors are screws.

14. A common electrode comprising a plurality of gripping members for accommodating each of a plurality of lamp tubes, each gripping member defining opposing first and second elastic members, and at least one of the gripping members having a different lengths from the other gripping members.

15. The common electrode according to claim 14, wherein the opposing elastic members have different lengths.

16. A back light unit, comprising:
    a plurality of lamps arranged at predetermined distances from each other, each lamp having a lamp tube provided with electrodes at both ends thereof; and
    common electrodes provided to communicate with both ends of said plurality of lamps, said common electrodes containing a plurality of gripping members for accommodating each of said plurality of lamps, each gripping member defining opposing first and second elastic members, said first elastic member having a different length from said second elastic member.

17. The back light unit of claim 16, wherein the plurality of gripping members of each common electrode are spaced apart from each other to secure the electrode of each lamp to each common electrode,
    said common electrode containing first and second common electrode lines formed at both sides of the gripping members for connecting the gripping members together.

18. The back light unit of claim 17, further comprising a plurality of stoppers provided in the second common electrode line corresponding to the gripping members to prevent the lamps from inclining to the right or the left.

19. The back light unit of claim 16, further comprising a diffusion sheet and a diffusion plate disposed above the lamp for scattering light emitted from the lamp.

* * * * *